United States Patent [19]

King, Sr.

[11] 4,317,471

[45] Mar. 2, 1982

[54] ATTACHMENTS FOR FLEXIBLE OR RIGID TUBING

[76] Inventor: Lloyd H. King, Sr., 311 Blake Rd., Hopkins, Minn. 55343

[21] Appl. No.: 28,490

[22] Filed: Apr. 9, 1979

Related U.S. Application Data

[62] Division of Ser. No. 875,425, Feb. 6, 1978, abandoned.

[51] Int. Cl.³ .............................. F16L 25/00; F03B 7/08
[52] U.S. Cl. ...................................... 137/798; 137/115; 285/12; 285/319; 285/323; 285/423; 285/DIG. 22
[58] Field of Search ............... 285/239, 249, 255, 174, 285/DIG. 22, 260, 423, 175, 322, 323, 179, 12, 319, 177, 247; 137/798, 115

[56] References Cited

U.S. PATENT DOCUMENTS

| | | | |
|---|---|---|---|
| 1,043,683 | 11/1912 | Fieser | 285/174 |
| 2,452,219 | 10/1948 | Bergvall et al. | 285/DIG. 22 |
| 3,684,321 | 8/1972 | Hundhausen | 285/423 X |
| 3,899,198 | 8/1975 | Maroschak | 285/174 X |
| 4,103,941 | 8/1978 | Stoll | 285/322 X |

FOREIGN PATENT DOCUMENTS

| | | | |
|---|---|---|---|
| 845563 | 6/1978 | Canada | 285/319 |
| 2624241 | 12/1977 | Fed. Rep. of Germany | 285/239 |
| 295389 | 4/1965 | Netherlands | 285/DIG. 22 |
| 884698 | 12/1961 | United Kingdom | 285/260 |
| 1013204 | 12/1965 | United Kingdom | 285/175 |
| 499452 | 4/1976 | U.S.S.R. | 285/260 |

*Primary Examiner*—Dave W. Arola
*Attorney, Agent, or Firm*—Jacobson and Johnson

[57] ABSTRACT

An attachment for flexible or rigid tubing including a male connector for extending into frictional engagement with either flexible or rigid tubing. The male connector includes a sealing member and a set of annular concentric ridges that provide means for sealing the male connector with either flexible or rigid tubing. A compression fastener holds the male connector and tubing in sealing engagement when the attachment is pressurized.

3 Claims, 11 Drawing Figures

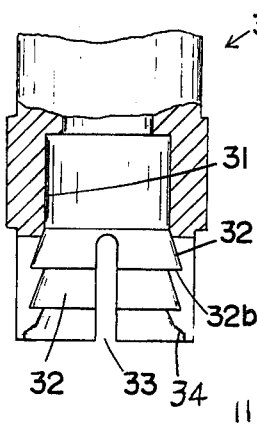
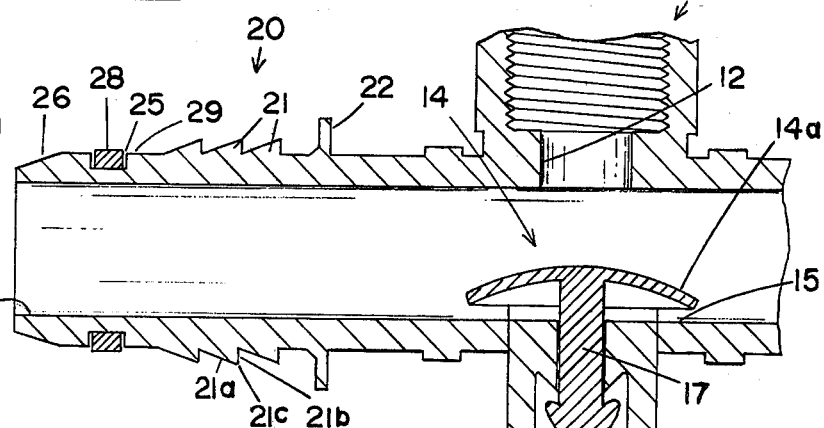
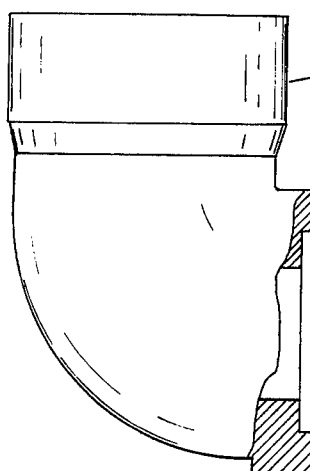
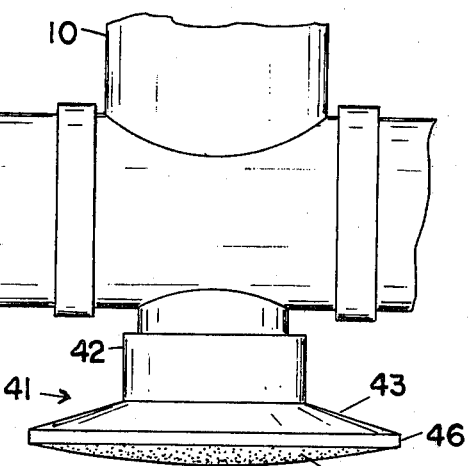
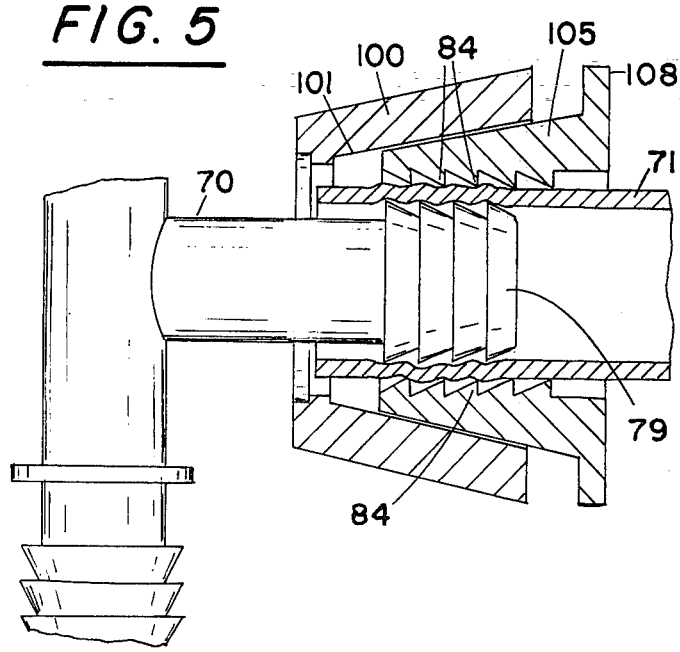
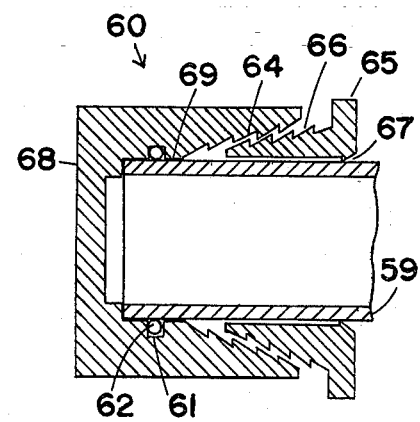

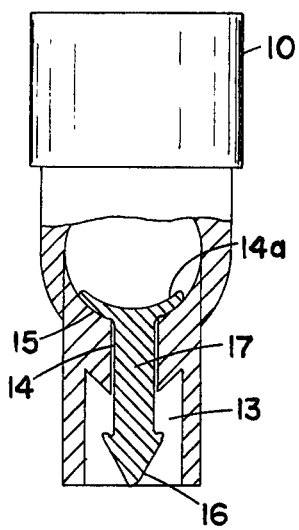
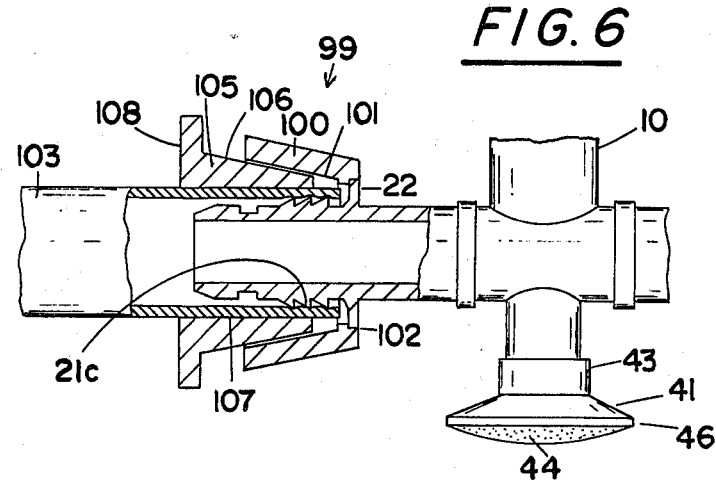
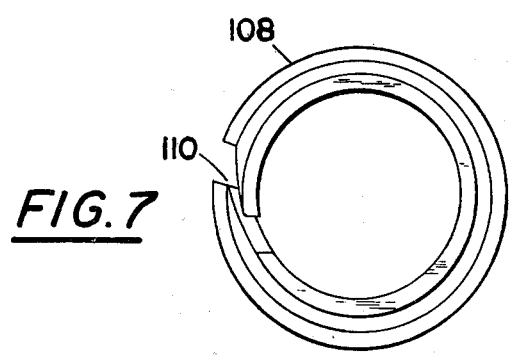
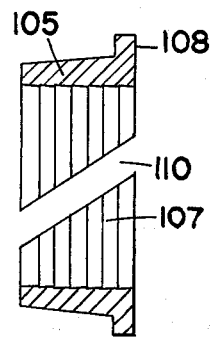
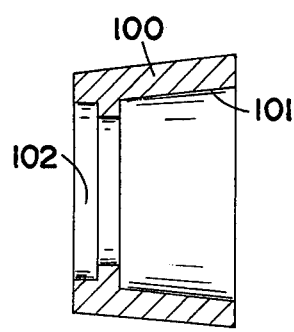
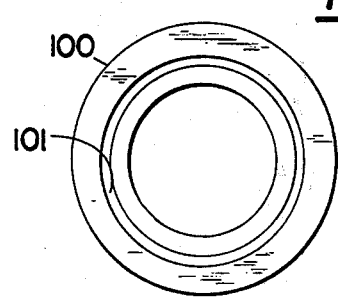

ATTACHMENTS FOR FLEXIBLE OR RIGID TUBING

This is a division of application Ser. No. 875,425, filed Feb. 6, 1978, and now abandoned.

BACKGROUND OF THE INVENTION

1. Field of the Invention

This invention generally relates to attachments and, more specifically, to attachments having connectors suitable for connecting to either flexible or rigid tubing.

2. Description of the Prior Art

The concept of attachments such as drainage valves, tees, elbows and caps for flexible or rigid tubing are well known in the art. Typical prior connectors for flexible tubing include a series of concentric ridges located on a male fitting which one forces into the flexible tubing. The concentric ridges are located in spaced sequence on the male fitting so that pushing the tubing into the male fitting produces a tight fit and slight outward deformation of the tubing. Squeezing a steel band clamp around the tubing and male fitting completes the joint and the seal. The use of flexible tubing and metal fastening devices work well in most conditions, however, in applications such as sprinkler systems or the like which require underground junctions, the metal fasteners have certain disadvantages. For example, certain soil erodes even a stainless steel band clamp in a short time. If the clamp erodes, only the compressive strength of the tubing holds the two members together. Leakage or rupture of the line usually results under these conditions. Another disadvantage is that prior art connectors work either with flexible plastic tubing or rigid plastic tubing but not both. Rigid plastic tubing requires different types of connectors. The most common connector for rigid plastic tubing is the permanent joint sealing by bonding with a suitable solvent.

The present invention provides an attachment having a male connector and a fastening member which are formed of the same material as the tubing and are therefore not susceptible to soil corrosion. The present invention also provides means for quickly and effectively sealing two members together whether the tubing is flexible or rigid.

SUMMARY OF THE INVENTION

Briefly, the present invention comprises an attachment having a connector with a set of concentric ridges thereon for engaging a flexible tubing and a sealing surface for connection to rigid tubing. A two-part fastener holds the connector in pressure engagement with either rigid or flexible tubing.

BRIEF DESCRIPTION OF THE DRAWINGS

FIG. 1 is a sectional view of an attachment and a male connector;

FIG. 2 is a female connector;

FIG. 3 is a partial sectional view showing male and female connectors in sealing engagement;

FIG. 4 is a sectional view of an end cap for rigid pipe;

FIG. 5 is a sectional view of an attachment with flexible pipe;

FIG. 6 is a sectional view of an attachment and a male and female connector;

FIG. 7 is an end view of a fastening wedge;

FIG. 8 is a sectional side view of a fastening wedge;

FIG. 9 is an end view of a fastening collar;

FIG. 10 is a sectional view of a fastening collar; and

FIG. 11 is a sectional end view of an attachment having a flexible valve.

DESCRIPTION OF THE PREFERRED EMBODIMENT

FIG. 1 shows a drainage valve structure 10 having a dual connector 20 for attachment to either flexible or rigid tubing. Drainage valve 10 has an axial fluid passage 11 with an upper discharge port 12 and a lower drainage port 13 having a flexible valve member 14 therein. Valve member 14 contains a valve head 14a, a retaining head 16 and stem 17 formed of resilient material such as plastic or rubber. Stem 17 has a smaller cross-sectional area than the opening in upper portion of discharge port 13 to allow fluid to flow out port 13 when valve 14 is in the position shown in FIG. 1. The material of valve member 14 has sufficient flexibility so that with low or no fluid pressure in fluid passage 11 flexible valve head 14a maintains the position shown in FIG. 1, however, introducing pressurized fluid into passage 11 seats the underside of flexible valve head 14a against surface 15 (see FIG. 11). Seating flexible valve 14 on surface 15 prevents fluid from discharging through port 13 as long as the pressure is maintained in passage 11. If drainage valve 10 is used wth an underground sprinkler system, the pressure is adjusted so that during sprinkling the high pressure fluid holds valve head 14a against sealing surface 15. However, as the pressure is relieved, i.e., the system shut down, the resiliency of material in flexible valve 14 forces valve head 14a to a return to the condition shown in FIG. 1. In this condition fluid in the passage 11 drains from discharge port 13 located around stem 17. Retaining head 16 forms a check valve that seats and seals around stem 17 to prevent backflow into passage 11.

Located at one end of drainage valve attachment 10 is dual male connector 20 containing a set of concentric annular ridges 21 each containing an annular forward surface 21a and an annular rearward surface 21b. The junction of the two surfaces produces a set of sharp annular edges 21c that can engage a flexible pipe. Located in front of concentric annular ridges 21 is a cylindrical sealing groove 25 that holds a sealing ring 28. The end of connector 20 contains a cylindrical section 29 and a conical inward tapered section 26. Tapered section 26 facilitates installation of connector 20 into the tubing. Located at the rear of connector 20 is an annular shoulder 22 for supporting a fastening collar. Connector 20 is operable for engagement with either rigid tubing or the rigid female connector 30 shown in FIG. 4 or the flexible tubing shown in FIG. 6.

FIG. 2 shows a female connector 30 containing a set of concentric recess regions having an annular surface 32a and 32b. The annular concentric regions 32 are separated by a set of elongated slots 33 which are spaced equidistance around the periphery of connector 30. The slots 33 produce a set of finger-like projections containing a portion of the concentric recess regions. The finger-like projections provide flexibility to female connector 30 so that the fingers can be slid into engagement with male connector 20 as shown in FIG. 3. Located at the end of connector 30 is a recess 34 that enables an operator to easily remove member 30 from a connector by inserting a radial expansion tool therein. Located inside connector 30 is a cylindrical flow passage 34 which is substantially the same diameter as the inside diameter of commercially available rigid tubing.

The diameter of cylindrical surface 31 is larger than flow passage 34 and is slightly larger than the diameter of male connector 20 in the region of sealing ring 29. If desired, tubing can be solvent sealed to cylindrical surface 31.

To understand the operation and coaction of connector 30 and connector 20, reference should be made to FIG. 3 which shows connector 30 sealingly engaged with attachment 10. Connector 30 is shown with a conventional elbow 40 while connector 20 contains drainage valve 10 containing a porous dirt protection pad 41. Porous pad 41 fastens to the outside of port 13 and includes a collar 42, a diverging conical section 43 and a pad supporting disk 46 having a porous pad 44 fastened thereto. Pad 44 keeps dirt out of port 13 (FIG. 1) while allowing fluid to drain from port 13 through pad 44 and into the ground. Typically, pad 44 may be made of a material such as Dacron fiber.

Female connector 30 and male connector may be part of an underground sprinkler system. Female connector 30 and male connector 20 are held in engagement by the set of concentric annular ridges 21 on connector 20 which mate with the concentric recess regions 32 on connector 30. Sealing ring 45 forms a sealing relationship between cylindrical surface 31 and connector 20.

The junction provided by connector 30 and connector 20 are not only leakproof under high pressure, but allow rotation of connector 30 with respect to connector 20. Actual tests with both rigid or flexible pipes the operating pressure has exceeded 185 psi. with no leakage at the connections.

To appreciate the dual purpose of connector 20, reference should be made to FIG. 6 which shows drainage valve 10 with dual connector 20 fastened to a flexible tubing 103. Reference to FIGS. 7-10 shows the details of the fastening member used to connect tubing 103 to connector 20. When tubing 103 and connector 20 are assembled, annular edges 21c frictionally engage or bite the interior of flexible tubing 103. Flexible tubing 103 is held in pressure contact with annular ridges 21c because the outside diameter of annular ridges 21 is slightly larger than the inside diameter of flexible tubing 103. To prevent slippage and leakage between connector 20 and tubing 103, a fastening member 99 securely holds tubing 103 to connector 20. Fastening member 99 is comprised of a cylindrical tapered fastening collar 100 having an annular shoulder 102 for engagement with shoulder 22 of connector 20. The interior surface 101 of collar 100 tapers conically inward toward the shoulder 22 of connector 20. A split cylindrical fastening wedge 105 having a wedge-shaped cross section with a conical tapered surface 106 is located around flexible tubing 103 and partially inside of fastening collar 100. Reference to FIGS. 7-10 shows in greater detail collar 100 and wedge 105 including an opening 110 located diagonally across wedge 105. While a diagonal split is preferred, an opening which is at a different angle would also be usable. Opening 110 allows for diametrical compression of fastening wedge 105. Split fastener wedge 105 contains an annular shoulder 108 for forcing split fastening wedge 105 into rigid fastening collar 100. FIG. 6 shows surface 106 of wedge 105 and surface 101 of collar 100 in frictional engagement. Normally, the inherent characteristics of polymer plastics such as PVC, which are used in fastening wedge 105, and fastening collar 100 prevent slipping of fastening member 105 with respect to fastening member 100. However, to insure greater frictional contact, split fastening wedge 105 or surface 101 can contain a ribbed surface 107 for better frictional engagement of tubing 103.

Fastening member 99 is also usable with either rigid or flexible tubing. FIG. 4 shows an alternate embodiment of the fastening collar in the form of a fastening cap 60. Fastening cap 60, shown in FIG. 4, contains a cap end 68 on one end and a cylindrical surface 69 for engaging a rigid tubing 59. Also located in cap 60 is a sealing groove 61 and a sealing ring 62 located therein. Fastening cap 60 is similar to fastening collar 100 and contains a rigid concentrically tapered surface having a set of concentric rings 64 thereon for forming mating and locking engagement with split ring wedge member 65 which is similar to split fastening wedge 105. Wedge member 65 also contains a set of concentric ridge members 66 which are located on a conical tapered surface to mate with concentric rings 64 located on fastening cap 60. Located on the rear edge of fastening wedge 65 is an annular ridge 67 for engaging the exterior of rigid tubing 59. The coaction and locking of fastener 60 is obtained by forcing split wedge fastener 65 into the tapered opening in member 60. While sealing groove 61 is shown located in cap 60, one could also place sealing groove in the rigid tube 59, however, it is preferred to have the sealing groove in the cap and thus avoid modifications to the exterior of the rigid tubing.

Reference to FIG. 5 shows a conventional T attachment 70 connected to a flexible tubing 71 by an alternate embodiment of two-part fastening collar 100 and fastening wedge 105. Fastening collar 100 and fastening wedge 105 are identical to the embodiment shown in FIG. 6 with the exception of larger annular ridges 84 which are located inside of fastening wedge 105. T 70 contains a set of concentric ridges 70 for engaging the inside surface of flexible tubing 71. Forcing split ring fastener 105 into collar 100 causes engagement of annular ridges 84 with the outside of tubing 71 thereby providing a tight leakproof locking action between the rings 79 and flexible tubing 71. To remove wedge 105 from collar 100, a space is provided between the end of collar 100 and ridge 108. The space allows for insertion of an expansion tool or flat blade which can be rotated to separate wedge 105 from collar 100.

In an alternative embodiment, wedge 105 or collar 100 contains spiral grooves to allow the wedge to be turned into collar 100. In this event the edges of the wedge at the opening would be slightly tapered to prevent a locking action during turning of wedge 105 into collar 100.

Typically, collar 100 can be made of a polymer plastic material which has a tensile strength equal to or greater than metal clamps.

I claim:

1. An attachment having a multiple male connector for forming a leak-proof connection to either a rigid tubing or a flexible tubing, said multiple male connector having a first tubing engaging surface for forming sealing engagement with a flexible tubing and a second tubing engaging surface for forming sealing engagement with a rigid tubing, said male connector including a frusto-conical region to facilitate insertion of said male connector into a tubing, said first tubing engaging surface having a set of concentric spaced annular ridges which are operable for engaging the interior of a flexible tubing, said second tubing engaging surface having a region slightly smaller than the inside diameter of a rigid tubing suitable for connection thereto, said second tubing engaging surface having a diameter less than said first tubing engaging surface, said second tubing engaging surface comprises a cylindrical region located adjacent to said first tubing engaging surface, said second tubing engaging surface having a sealing ring extending therearound for sealingly engaging a rigid tubing so that said male connector can be connected to either a rigid tubing or a flexible tubing but not both at the same time.

2. The invention of claim 1 including a drainage valve connected thereto.

3. A female connector for attachment to a male connector, said female connector having a first end and a second end, said female connector having a first surface located on said first end for engaging a rigid tubing engaging section on a male connector and a second surface located on said first end for engaging a flexible tubing engaging section of a male connector, said female connector including an interior cylindrical surface operable for forming sealing engagement with a rigid tubing engaging surface on male connector which is operable for forming sealing engagement with a rigid tubing, said interior cylindrical surface having an interior dimension slightly larger than the exterior dimension of the rigid tubing engaging surface on the male connector to be connected therewith, said female connector having a member, said member having a plurality of recess regions for forming interlocking engagement with a plurality of ridges located on a male connector to permit said recess regions on said female connector to be operable for engaging the plurality of ridges on the male connector for the purpose of holding said female connector to a male connector, said member comprised of an elongated flexible finger-like projection operable for flexing sufficiently to enable one to slide said members with said recess regions onto the flexible sealing surfaces on a male connector to thereby hold said female connector to a male connector having accommodations for either a rigid tubing or a flexible tubing.

* * * * *